July 12, 1966    K. J. STETTEN ETAL    3,261,009
SEISMIC PERSONNEL SENSOR
Filed March 10, 1964
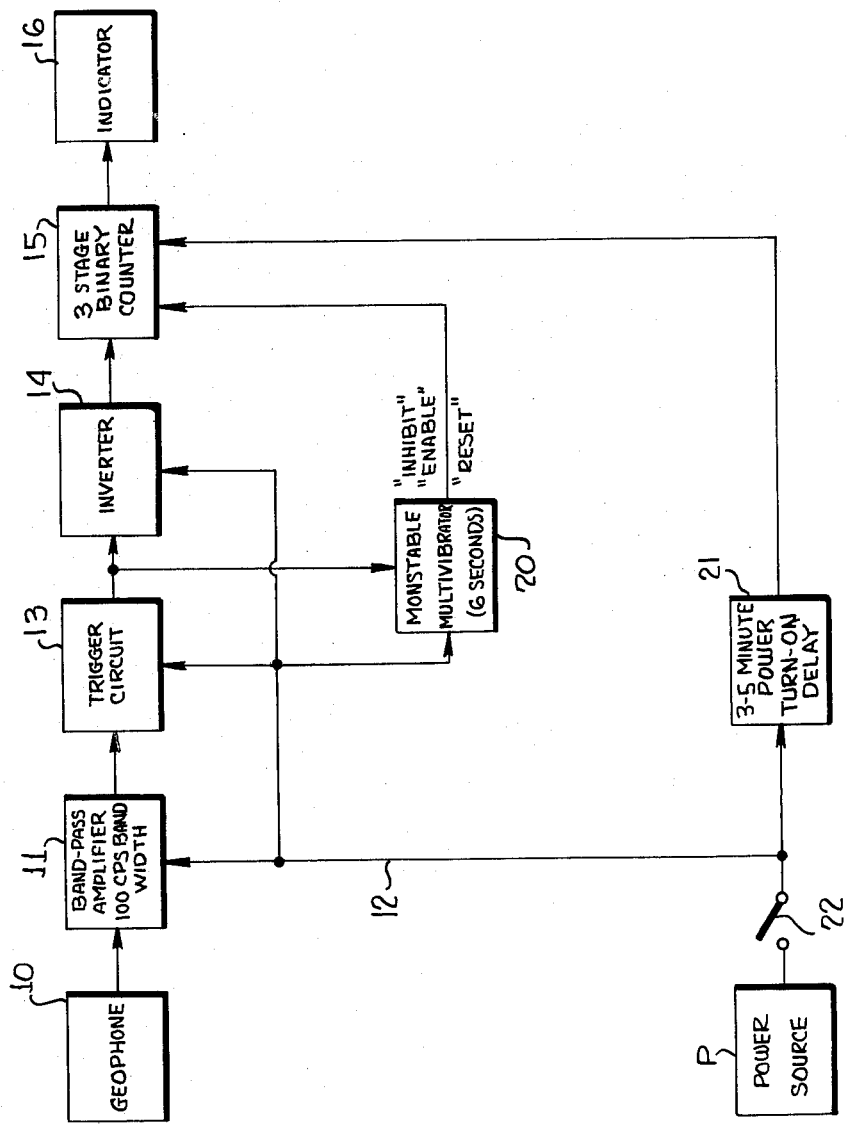
INVENTORS
KENNETH J. STETTEN
& JAMES WALLEN, JR.
BY *Hurvitz & Rose*
ATTORNEYS

United States Patent Office 3,261,009
Patented July 12, 1966

---

3,261,009
SEISMIC PERSONNEL SENSOR
Kenneth J. Stetten, McLean, and James Wallen, Jr., Falls Church, Va., assignors to Melpar, Inc., Falls Church, Va., a corporation of Delaware
Filed Mar. 10, 1964, Ser. No. 350,811
1 Claim. (Cl. 340—261)

The present invention relates generally to personnel sensing devices, and more particularly to passive seismic personnel sensors.

It has been common to detect intrusion of personnel into a protected area by devices requiring direct contact with such personnel for their operation, or, by devices which set up an acoustic or electromagnetic wave pattern subject to disturbance or distortion by intruding personnel. Such devices involve a small sensing radius or a difficult logistics problem. It is a feature of the present invention to utilize seismic principles to detect intrusion of personnel into a protected area. Devices in accordance with the invention have been built and tested, which have a range in excess of 100 feet.

The range of a seismic personnel sensor is in large part limited due to the probability of false indications produced by the presence of animals, vehicles, or natural disturbances. To significantly reduce such false indications, logic and timing circuits are utilized which respond only to seismic signals having a pattern which has a predetermined character in amplitude and time.

Seismic signals are sensed by a geophone, which generates a voltage which is proportional to soil displacements occurring adjacent to the geophone. This voltage is amplified by a narrow bandpass amplifier with a gain of approximately $10^5$. The amplified signal feeds a threshold-detecting trigger circuit, which generates a pulse only if the signal amplitude exceeds a given level. The time constant of the trigger circuit is arranged to respond to a maximum pulse rate of four per second. Pulse rates in excess of these do not produce successive responses in the trigger response. If the rate is smaller, the trigger responses drive a three stage-chain of binary counters and a six second monostable multivibrator. From a quiescent state, the initial pulse provided by the trigger circuit fires the multivibrator, initiating a six second timing pulse. The latter enables the counter chain. If three additional successive pulses are received and counted by the counter chain during the timing pulse the counter chain will produce an output indication. If not, the return of the six second pulse resets the counters, in preparation for a succeeding operation. The final counter stage is biased to turn on in proper condition to avoid a false indication in response to power turn-on.

It follows from the above brief description that the system is set to respond to a set of four pulses, occurring in a six second interval, and at a rate of less than four per second, the pulses all to have at least a predetermined amplitude. Animals, if small, may not produce seismic signals of the required amplitudes and if large may not generate signals having the required time pattern. Vehicles, wind, thunderstorms, and the like generally will not provide the required pattern. Personnel who are aware of the pattern can intrude by walking very slowly, i.e. at less than four steps in six seconds, but this enforces a long stay in the protected area, which leads to detection. A running man or a normally walking man will set off an alarm, since the seismic signals produced by him will fall into the preset pattern.

The above and still further objects, features and advantages of the present invention will become apparent upon consideration of the following detailed description of one specific embodiment thereof, especially when taken in conjunction with the accompanying drawings, wherein the single figure of the drawings is a block diagram of a preferred embodiment of the invention.

Referring now more particularly to the accompanying drawings, the reference numeral 10 denotes a geophone, mounted in an area to be protected from intrusion by personnel. Geophone 10 is connected to a bandpass filter 11, of about 100 c.p.s. wide, perhaps in the band 5 to 100 c.p.s. The precise width is not critical, and an upper value extending to 300 c.p.s. could well be used. A voltage gain of about 90 db is desired, coupled with exclusion of noise signals. To this end, a compromise design is achieved of slight bandwith and high gain, the precise values of which do not concern the essence of the invention, and are, moreover, predicated on the characteristics of the specific geophone which is employed.

Bandpass filter 11 may be an active filter, and if so is supplied with operating voltage at lead 12, from a power source P. Connected in cascade with the filter 11 are, in sequence, a trigger circuit having a preset triggering level, 13, an impedance matching inverter 14, a three stage binary counter 15, and an indicator 16.

A six second monostable multivibrator 20 is connected at its input to the trigger circuit, and at its output to the three stage binary counter. The counter 15, as will appear in describing the operation of the system, can have more or fewer stages, and the timing of the multivibrator 20 can be more or less than six seconds, to suit particular operating conditions.

The counter 15 is connected to the source of power P, but via a delay device 21, providing a 3–5 minute power turn or delay. A slow to make relay can be utilized, or a clock timer, or any other common instrumentality for closing a power circuit only after a considerable time elapse from closure of a power switch as 22.

The indicator 16 may be aural, visual, or may be a radio transmitter, or a squib, or the like. The indicator 16 is operated in response to a count by the last stage of counter 15. The counter 15 is therefore designed so that its last stage is biased to off condition in response to power turn on, i.e. in such condition that it does not actuate indicator 16.

The multivibrator inhibites the counter 15 while in the off condition, and enables the counter 15 while in the on condition.

In operation, the system is installed in an area to be protected, switch 22 closed, and the installing personnel leave. The delay unit then inhibits application of power to the counter 15 for a sufficiently long time to permit exit of the installing personnel from the area. Once the delay time has elapsed the system becomes operative, as a whole, and those parts of the system which were rendered operative immediately on closure of switch 22 become quiescent.

In operation, each pulse of pressure detected by the geophone 10 causes an amplified pulse to be applied to the trigger circuit 13. The latter is arranged to respond to pulses only if they are of sufficient amplitude and occur at a rate of less than four per second, i.e. the trigger circuit is designed to have a time constant of .25 second, such that it cannot accept and respond to a succeeding pulse which occurs within .25 second of a preceding pulse.

On receiving a first pulse, the trigger circuit transmits an enabling pulse to a monostable multivibrator 20 and to inverter 14. The latter is essentially an impedance matching and polarity inverting device, which provides pulses of suitable character to operate counter 15. The monostable multivibrator now turns on, for a six second period, and enables the counter 15 to count the incoming pulses.

Any further incoming pulse, applied to the monostable multivibrator 20 during the six second interval, has no effect on the multivibrator. If the pulses arrive at the geophone at insufficient level to actuate trigger circuit 13, the system remains quiesent. If the pulses exceed the preset level for the triggering circuit, but occur at a rate of greater than four per second the triggering circuit responds to only the first of the pulses. But if the pulses occur at a rate of less than four per second, the trigger circuit responds, and the counter 15 is supplied with pulses. However, the counter is enabled for only six seconds. Therefore, unless four pulses occur within six seconds, which have a spacing of at least .25 second, the counter 15 will fail to complete its count and energize indicator 16.

At the end of six seconds, the multivibrator 20 resets itself, and in so doing resets the counter 15. The indicator 16 may be arranged to continue actuated until reset, once it has been actuated by completion of a pulse count.

In essence, then, the present system is a seismic pattern recognition system, requiring for its operation four pulses of at least predetermined amplitudes, which occur in a preset interval, with a minimum preset spacing. The intervals, amplitudes and spacings can be preset to suit operating conditions.

A small animal intruding into the protected area would generate pulses of insufficient amplitude to actuate the indicator. A large animal would be unlikely to conform to the pattern if it walked on four legs. A falling object, wind, thunder, lightning, etc. would not provide four pulses of the required character and spacing. A man, on the other hand, would, even if he knew the pattern to be avoided, be constrained to walk so slowly, that he would be in the area for a long time, and hence be subject to detection, or to run very rapidly, i.e. at more than four steps per second consistently while in the area. The system is constantly on the alert while an intruding personnel is present, and monitors a very large area. It follows that the intruder could not avoid conforming to the pattern of the unit at least for one six second interval while in the area, as a practical matter.

While we have described and illustrated one specific embodiment of our invention, it will be clear that variations of the details of construction which are specifically illustrated and described may be resorted to without departing from the true spirit and scope of the invention as defined in the appended claim.

What we claim is:

Sensing apparatus for detecting disturbances occurring in a protected area at rates within a range of rates having fixed maximum and minimum limits, said apparatus comprising:

a geophone for generating voltages proportional to the magnitude of disturbances in the form of impulses of pressure exerted against a surface within said protected area;

a high gain bandpass amplifier responsive to voltages generated by said geophone for amplification of only those voltages deriving from pressure pulses detected by said geophone separated by time intervals defining a frequency within the pass band of said amplifier;

a trigger circuit responsive to only those amplified voltages from said amplifier having an amplitude greater than a preselected reference amplitude for generating an initial pulse in response to the first of the last-mentioned amplified voltages, said trigger circuit having a time constant selected to permit the generation of subsequent pulses therefrom only in response to subsequent ones of said last-mentioned amplified voltages separated from the immediately preceding amplified voltage by at least a predetermined time interval;

a normally disabled electronic binary counter coupled to said trigger circuit;

a monostable multivibrator responsive to said initial pulse for enabling said counter to count each of said subsequent pulses only during a preset time interval greater than said predetermined time interval and for resetting said counter at the conclusion of said preset time interval; and normally deactivated indicating means coupled to said counter for activation thereby only in response to said counter attaining a predetermined count wholly within a single said preset time interval, whereby said maximum limit is fixed by said predetermined time interval and said minimum limit is fixed by said preset time interval.

References Cited by the Examiner

UNITED STATES PATENTS

| | | | |
|---|---|---|---|
| 2,007,371 | 7/1935 | Hopkins | 340—261 |
| 2,578,347 | 12/1951 | Gagnaire | 340—261 |
| 2,709,251 | 5/1955 | Schmidt | 340—261 |
| 2,767,393 | 10/1956 | Bagno | 340—258 |
| 2,826,753 | 3/1958 | Chapin | 340—258 |
| 2,942,247 | 6/1960 | Lienau | 340—261 X |
| 3,061,829 | 10/1962 | Roberts | 340—258 |
| 3,134,970 | 5/1964 | Kelly | 340—261 |
| 3,158,850 | 11/1964 | Poznanski | 340—258 |

NEIL C. READ, *Primary Examiner.*

R. M. GOLDMAN, *Assistant Examiner.*